May 23, 1972  T. A. RICH  3,664,740
SELF ADJUSTING-SHORT PULSE DETECTING AND AMPLIFYING CIRCUIT
Filed July 10, 1969  2 Sheets-Sheet 1

INVENTOR
THEODORE A. RICH
BY Charles Helzer
ATTORNEY

United States Patent Office 3,664,740
Patented May 23, 1972

3,664,740
SELF ADJUSTING-SHORT PULSE DETECTING
AND AMPLIFYING CIRCUIT
Theodore A. Rich, Scotia, N.Y., assignor to Environmental Technology Incorporated, Latham, N.Y.
Filed July 10, 1969, Ser. No. 840,775
Int. Cl. G01n 1/00, 15/02, 21/00
U.S. Cl. 356—37                                    25 Claims

ABSTRACT OF THE DISCLOSURE

A self-adjusting detecting and amplifying circuit is described for use with electrically operable detecting elements such as a cadmium sulphide photo conductor for sensing short term changes in a physical phenomenon such as a light pulse that goes from a first condition or level of intensity to a second different condition or level of intensity as distinguished from longer term changes in operating condition of the detecting element due to temperature effects, aging, dust or dirt in the optical path to the photo conductor, etc. A field effect transistor is connected in series circuit relationship with a photo conductor detecting element and the series circuit thus comprised is connected across a source of electrical energy. An output circuit is connected across the photo conductor and is responsive to both long and short term changes in operating condition of the detecting element. A feedback circuit comprising a resistor-capacitor network having a long RC time constant is coupled between the output circuit and the input to the field effect transistor for controlling its conductivity. The feedback signal is adjusted so as to control the conductivity of the field effect transistor in a manner to maintain constant voltage across the photo conductor detecting element. An output indicating means such as a meter is coupled across the output circuit through a coupling capacitor, pulsed, transient coupling transformer, or the like and is responsive substantially only to short term changes in signal level. The D.C. component of the signal including long term changes due to undesired temperature effects, aging, etc. is blocked by the coupling capacitor, coupling transformer, or the like. By this means, sensitivity of the circuit is maintained despite dust accumulation or other undesired light path modulating effects with only a relatively simple inexpensive circuit.

BACKGROUND OF INVENTION

Field of invention

This invention relates to a self-adjusting detecting and amplifying circuit.

More particularly, the invention relates to a detecting and amplifying circuit for low cost detectors such as electro-optical detectors of the cadmium sulphide photo conductor type for automatically correcting for the long term changes in sensitivity of the detector due to such factors as dirt and dust collection, aging, temperature, etc., and suitable for use in measuring instruments such as condensation nuclei meters.

Statement of prior art

Maintaining measuring instrument sensitivity over long periods of usage has been in the past and presently is a continuing problem for measurement engineers. There are numerous examples of complex and costly detection and amplification circuits for maintaining measuring system sensitivity through the use of power supply regulation schemes, and the like. However, most of these prior art measuring circuit stabilization schemes add so much complexity, weight, size and cost to the measuring system in which they are included that their use is prohibited in many measuring circuit applications. To meet the need for a good, low cost, self-correcting, sensitivity maintaining, detecting and amplifying circuit for use with a wide variety of measuring instruments, the present circuit was devised.

SUMMARY OF INVENTION

It is therefore a primary object of the present invention to provide a new and improved detecting and amplifying circuit for use with a wide variety of measuring or detecting elements, and which automatically maintains its sensitivity over wide periods of usage despite the effects of aging, dust and dirt collection, temperature, etc.

Another object of the invention is to provide a detecting and amplifying circuit having the above characteristics which is relatively simple in construction and low in cost while maintaining high accuracy.

A still further object of the invention is the provision of such a detecting and amplifying circuit which is particularly suited for use with low cost- electro-optical detectors such as cadmium sulphide photo conductors and yet still provide a highly accurate measuring system.

In practicing the invention, a self-adjusting, detecting and amplifying circuit is provided which comprises an electrically operable detecting element for sensing short term changes in a physical phenomenon such as a light level from a first condition or intensity to a second different condition or intensity as distinguished from longer term changes in operating condition of the detecting element due to temperature effects, accumulation of dust and dirt, aging and the like. A conductivity controlled means in the form of a field effect transistor is connected in series circuit relationship with the detecting element and with a source of electric energy for maintaining substantially constant long term electric energization conditions such as constant voltage across the detecting element. An output circuit means is coupled to the detecting element and is responsive to both long and short term changes in operating condition of the detecting element. A feedback circuit that preferably comprises a resistor-capacitor feedback network having a long RC time constant is coupled between the output circuit and the input to the conductivity controlled field effect transistor, and is responsive substantially only to the longer term changes in operating condition. By this arrangement, the field effect transistor continuously and automatically adjusts its conductivity so as to compensate for long term changes in operating condition of the photo conductor detecting element and thereby maintains substantially constant voltage across the detecting element. An output indicating means such as a meter is coupled to the output circuit and is responsive substantially only to the short term changes in operating condition of the detecting element and is thereby indicative of short term changes in the physical phenomena (such as change in light level) being sensed by the photo conductor detecting element. In preferred forms of the invention, the output indicating means also includes holding means for holding and providing a substantially continuous output indication of transient changes in the physical phenomenon (such as transient changes in light level due to the production of a cloud in the expansion chamber of a condensation nuclei meter) being sensed by the photo conductor detecting element. A capacitor or output coupling transformer is provided for blocking any long term direct current signal components that might be supplied to the output indicating means.

BRIEF DESCRIPTION OF DRAWINGS

Other objects, features and many of the attendant advantages of this invention will be appreciated more readily when the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENTS

Figure 1:
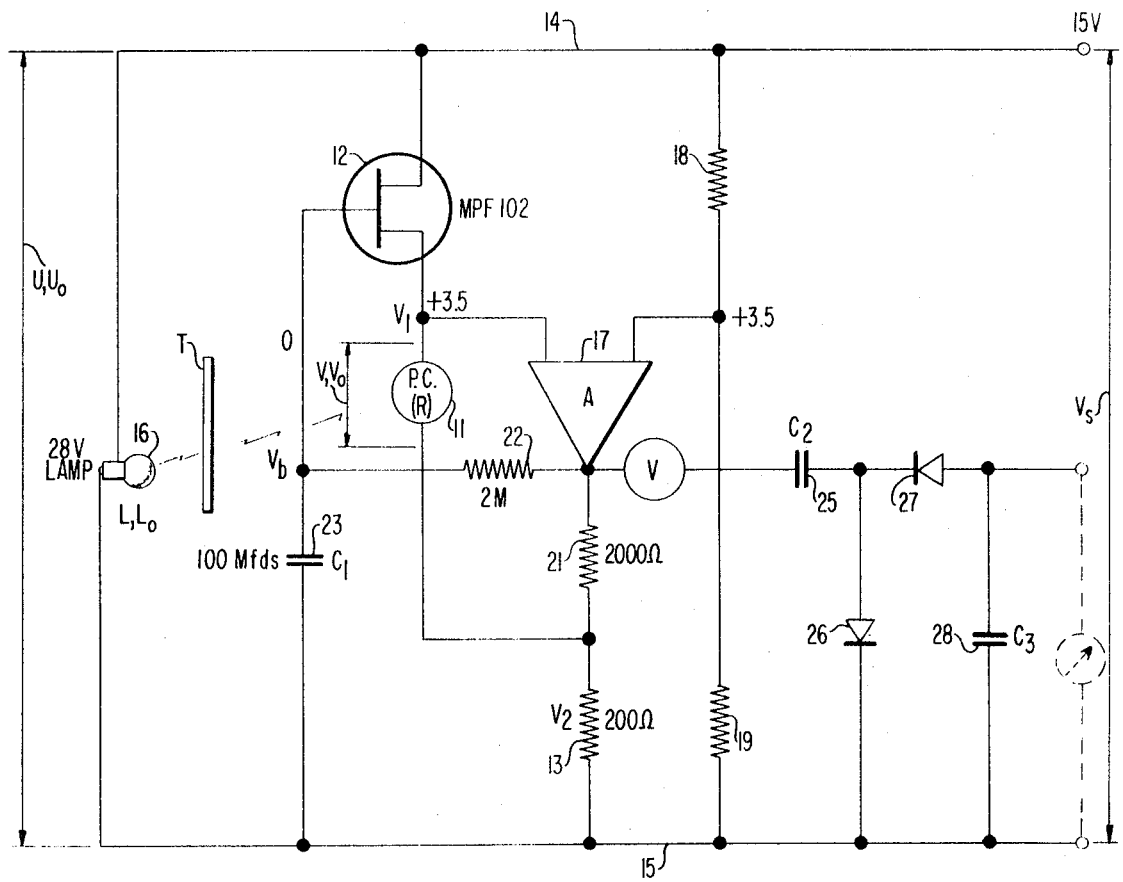
FIG. 1 is a detailed schematic circuit diagram of one form of a self adjusting short pulse detecting and amplifying circuit constructed in accordance with the invention.

FIG. 1 is a schematic circuit diagram of a self-adjusting detecting and amplifying circuit constructed in accordance with the invention. The circuit shown in FIG. 1 is comprised by a detecting element 11 that may comprise a low cost electro-optical detector such as a cadmium sulphide photo conductor, for example. While the invention is described herein for use in conjunction with electro-optical detectors such as photo conductors, photo cells, photo voltaic devices, and the like, it should be expressly understood that the circuit is in no way limited to use with such electro-optical sensing or detecting elements but could be used with any similar detecting elements such as a temperature sensitive thyristor, a moisture sensitive element, etc. wherein aging, temperature effect and the like, adversely affect the sensitivity of the element over prolonged periods of usage. For convenience, the present disclosure will refer to the detecting element as comprising a photo conductor since the immediate application of the circuit is in connection with stabilization of the operation of a photo conductor detecting element.

A conductivity controlled means comprised by a field effect transistor 12 is connected in series circuit relationship with the photo conductor detecting element 11 through a resistor 13 across a pair of power supply terminals 14 and 15 for supplying electric energy to the photo conductor 11. A lamp 16 also is connected across the power supply terminals 14 and 15 for supplying light through an enclosed path (not shown) to the photo conductor 11. It is intended in the circuit application shown in FIG. 1 that the light path intermediate the lamp 16 and photo conductor 11 intermittently will have its transmission characteristics changed by a phenomenon to be measured, as will be described more fully hereinafter in connection with FIG. 2 of the drawings. With the circuit arrangement shown in FIG. 1, it is desired to measure short term transient changes in the level or intensity of the light reaching the photo cell 11, and to derive an electric output signal representative of this change in light level. The output signal thus derived then provides a measure or indication of the nature of the change of the physical phenomenon which affected or changed the transmission characteristics of the light path coupling the lamp 16 to the photo conductor 11.

In addition to the short term transient changes due to changes in the transmission characteristics of the light path, long term changes in the voltage excitation of the photo conductor supplied from power supply terminals 14 and 15, aging, temperature, collection of dust and dirt on the optical path coupling lamp 16 to the photo conductor 11, and other factors can adversely effect the sensitivity of the circuit to the short term transient changes desired to be measured. In order to overcome such undesired long term effects, prior art measuring circuits have employed rather complex and costly power supply regulation circuit schemes for maintaining constant intensity of illumination of the lamp 16, or other comparable arrangements for maintaining sensitivity of the measuring circuit. These known arrangements are satisfactory for many purposes; however, because of their complexity and additional cost their use in a number of measuring applications becomes prohibitive. The invention herein described was devised in order to overcome the problems mentioned above with a relatively simple and low cost circuit which is reliable in operation, and is capable of maintaining the sensitivity of the instrument at desired high levels.

In order to derive an electric output signal from the photo conductor detecting element 11, the juncture of the photo conductor 11 with the field effect transistor 12 is conneced to one input of a differentially connected operational amplifier 17. The operational amplifier 17 may comprise any conventional, commercially available microminiaturized, integrated circuit operational amplifier such as are manufactured and sold by the Fairchild Camera Company, Signetics Corporation, Texas Instruments and others. The differentially connected operational amplifier 17 has a remaining input terminal, connected to a voltage divider comprised by resistors 18 and 19 connected intermediate to power supply terminals 14 and 15 and has its output connected across a local resistor including a resistor 21 connected in series circuit relationship with the resistor 13 between the output of operational amplifier 17 and the power supply terminal 15.

The output signal appearing across the output load resistor comprised by resistor 13 and 21 is coupled back through a feedback circuit means comprised by a resistor 22 and a capacitor 23 that form a feedback RC network having a relatively long time constant. This RC network is in effect connected in parallel circuit relationship with the output load resistors 13 and 21 and has the juncture of the resistor 22 and capacitor 23 connected to the gate electrode of field effect transistor 12. Field effect transistor 12 has its source electrode connected to the photo conductor 11 and its drain electrode connected to the power supply terminal 14. Accordingly, the conductivity of the field effect transistor 12 directly controls the voltage appearing across the photo conductor 11.

The output signal appearing across the output load resistors 13 and 21 also is coupled through a coupling capacitor 25 to a rectifying and filter network comprised by diodes 26 and 27 and a capacitor 28. A suitable indicating instrument can be coupled to and driven by the peak signal potentials appearing across the output capacitor 28 in a conventional manner.

In operation, the detecting and amplifying circuit will function under conditions wherein the intensity of the light reaching the photo conductor 11 is varied over a range greater than 2/1 which might practically be encountered in most measurement applications. The circuit parameters may be adjusted such that the voltage V appearing at the output of operational amplifier 17 across output resistors 13 and 21 is initially set to zero. If the light intensity reaching photo conductor 11 then falls off for any reason, the voltage V would have to go a little bit negative. Assuming that this change in light intensity is sufficiently long term so as to exceed the time constant of the RC feedback network 22, 23 then the voltage at the point *b* likewise would change very slowly to a slightly more negative value than it was prior to the change in light intensity. This decrease in voltage at point *b* is then coupled to the control gate of the field effect transistor 12 so as to decrease the conductivity of transistor 12, thereby increasing the voltage across the transistor and maintaining the voltage across the photo conductor 11 constant. Simultaneously with this action, the coupling capacitor 25 blocks off the long term or DC component so that any such long term adjustments are in no way reflected or appear in the output of the circuit.

If in contrast to the above briefly described long term adjustment to the circuit to maintain constant voltage across the photo conductor 11, there is an instantaneous or short term change such as would occur by very quickly interposing a shutter or other light absorbing or light scattering target in the optical path between the lamp 16 and photo conductor 11, then the light reaching photo conductor 11 will be attenuated only transiently. This will result in a short term or transient increase in the photo conductor resistance thereby instantaneously increasing the value of the voltage $V_1$ appearing at the juncture of photo conductor 11 with the source electrode of field effect transistor 12. Assuming that the operational amplifier 17 has a relatively high gain on the order of $10^5$, then if voltage $V_1$ goes up, say .315 volt, then the voltage $V_2$ appearing across resistor 13 must go down .315 volt and the instantaneous transient change in the output voltage V will be $$\frac{2200}{200} \times .315 = 3.85$$

volts. Because of the instantaneous or transient nature of this signal pulse (on the order of 0.5 second), the long time constant feedback network comprised by resistor 22 and capacitor 23 will not have sufficient time to change appreciably. Hence, no readjustment of the voltage applied across the photo conductor 11 will occur as a result of the short transient signal pulse which is desired to be measured. This short transient signal pulse is then coupled through the coupling capacitor 25 which blocks the DC component of the voltage V and allows only the pulse transient change in voltage to appear across the output capacitor 28 where it may be read out with a suitable instrument or meter.

The above briefly described mode of operation of the self-adjusting short pulse detecting and amplifying circuit can be better understood from a consideration of the following expressions which depict the manner of operation of the circuit. In these expressions, the terms employed have the following definitions:

R = Resistance of Photo Conductor
$L^n$ = Instantaneous value of light intensity reaching the photo conductor
$L_o^n$ = Initial value of the light intensity reaching the photo conductor upon initially placing the circuit in operation
U = Instantaneous value of the power supply voltage supplying the lamp 16
$U_o$ = Initial value of the voltage supplying lamp 16
$V_s$ = Supply voltage value supplying photo conductor 11
$V_b$ = Instantaneous value of the voltage at point $b$ supplied to the gate of field effect transistor 12
$V_o$ = Initial value of the output voltage under conditions where $U=U_o$ and the transmssion characteristic $T=1$
A = Attenuation and is equal to the value of 1 minus T(1—T)
T = Transmission characteristics of the optical path intermediate the light source 16 and the photo conductor 11
n = An exponent whose value is near unity for all practical purposes
$V_T$ = Change in output voltage due to the change in transmission characteristic T In the circuit arrangement of FIG. 1, the resistance value of the photo conductor 11 is given by the expression:

$$R = \frac{L^n}{K} \quad (1)$$

where K is a constant
and $$L^n = L_o^n T^n \left(\frac{U}{U_o}\right)^{4+n} \quad (2)$$

The circuit is initially adjusted under conditions where the light path between lamp 16 and photo conductor 11 is not blocked and T=1.0. Under these conditions the voltage $V_1$ is set so that the output voltage $V=V_o$. If the supply voltage $V_s$ then is much greater than the output voltage ($V_s > V$) or if the transistor characteristic tends to hold constant current as it does where a field effect transistor is employed, then the current through the photo conductor is not changed appreciably over a wide transient change in light level. This statement is established by the following expression:

$$V = IR = \frac{IL_o^n T^n}{K}\left(\frac{U}{U_o}\right)^{4+n} \quad (3)$$

where I is the current through the photo conductor.

$$\text{Initially } V = V_o = \frac{IL_o^n}{K}\left(\frac{U}{U_o}\right)^{4+n}$$

where conditions are such that $$U = U_o, \quad T = 1$$

Hence:

$$V = V_o T^n \left(\frac{U}{U_o}\right)^{4+n} \quad (4)$$

If the transmission characteristics T change, and the lamp intensity does not, then $$\Delta V = V_o - V = V_o(1 - T^n) = V_n n A$$

where A is the attenuation equal to $1-T$ and n has a value which for all practical purposes is near unity: Because of the high gain of A, a $\Delta V$ change in photo conductor will cause a $-\Delta V$ change in $V_2$ to maintain 3.5 v. at $V_1$.

From the above expressions, it will be seen that if the lamp changes output due to a voltage change in the power supply output or the like, or because of aging, dust collection in the optics, etc., which are relatively slow changes, the value of the voltage $V_b$ supplied to the gate of the field effect transistor 12 automatically is readjusted to give the same output voltage $V_o$ for $T=1$, then Equations 3 and 4 will be maintained, and the same change in output voltage V will be produced for corresponding values of inserted changes in transmission T.

These results can be easily checked by assuming a value $n=1$ and measuring the current I to determine that it does not change when T is changed slowly. If the light intensity (long term) is doubled, R drops to half its previous value, and the current I must be doubled. These are the conditions required to maintain constant $V_o$ across the photo conductor. That is to say, I=C/R where C is a constant. However, $$\Delta V = \Delta I \times \Delta R = \frac{C}{R} \times \Delta R = C$$

which by definition is a constant. Thus, it will be seen that the circuit works over a wide range of light changes much greater than the 2 to 1 variation that might practically be encountered in most measuring applications.

Figure 2:
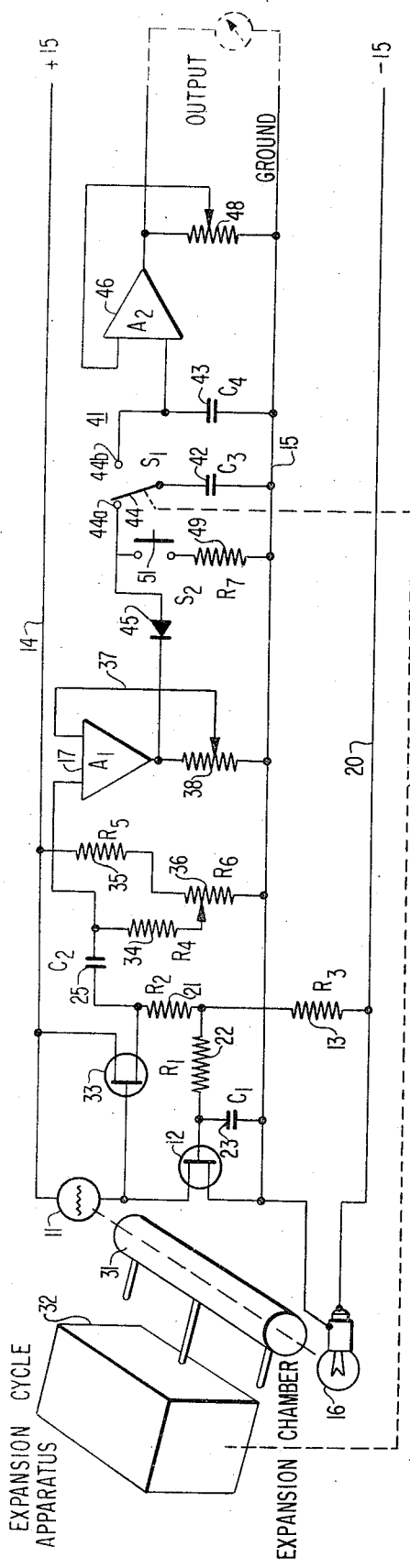
FIG. 2 is a detailed schematic circuit diagram of a second preferred form of the invention illustrating the connection of the circuit to a condensation nuclei meter for use in deriving an improved output signal from the condensation nuclei meter.

FIG. 2 is a schematic circuit diagram of a different form of the invention, and illustrates the manner in which the self-adjusting detecting and amplifying circuit is employed in connection with a condensation nuclei meter. In FIG. 2, the photoconductor 11 is shown as being illuminated by light rays from the lamp or light source 16 which have been transmitted through an expansion chamber 31. The expansion chamber 31 periodically has formed therein small water droplets about condensation nuclei as centered through the operation of a periodic expansion cycle apparatus 32 in a well-known manner such as is described in co-pending U.S. Pat. No. 2,684,008, issued July 20, 1954, for a "Method and Apparatus for Measuring the Concentration of Condensation Nuclei." During operation of the condensation nuclei meter, condensation nuclei to be measured periodically are introduced into the expansion chamber where during an expansion interval, small water droplets form about the condensation nuclei as centers. These water droplets produce a light scattering and attenuation effect on the light passing through the expansion chamber, and hence modulate the intensity of the light reaching the photo conductor 11. The circuit shown in FIG. 2 is intended to measure the modulation or instantaneous short term change in output voltage appearing across the photo conductor as an indication of the numbers of condensation nuclei contained in a sample gaseous atmosphere being monitored by the condensation nuclei meter.

Similar to the circuit arrangement shown in FIG. 1, the circuit of FIG. 2 includes a field effect transistor 12 having its source and drain electrodes connected in series circuit relationship with the photo conductor for maintaining long term constant voltage across the photo conductor. The juncture of the photoc ductor 11 with the drain electrode of the field effect transistor 12 is connected to the gate electrode of a second field effect transistor 43 having its drain and source electrodes connected in series circuit relationship with a pair of series connected load resistors 13 and 21 across the power supply terminal 14 and 16. The power supply terminal 14 is connected to a plus 15 volt source of electric energy, the power supply terminal 16 is connected to a minus 15 volt source of electric energy and the power supply terminal 15 is connected to a grounded supply terminal. The juncture of the load resistors 13 and 21 is connected back through the long time constant resistor-capacitor feedback network 22 and 23 to the control gate of the field effect transistor 12 in the manner previously described in connection with FIG. 1.

With the circuit shown in FIG. 2, the voltage across the photoconductor 11 is kept substantially constant at a nominal value of plus 10 volts. If this voltage tends to increase due to a reduction in light level because of dirty optics, change in supply voltage to the lamp 16, etc. the voltage at the juncture of the load resistors 13 and 21 tends to decrease. After a time delay determined by the RC time constant of resistor 22 and capacitor 23 the gate voltage of the field effect transistor 12 (hereinafter referred to as an FET) decreases and brings the voltage across the photo conductor 11 back towards its initial value. In one test setup of the circuit shown in FIG. 2, a slow change of 2 to 1 in the resistance of the photo conductor 11 resulted only in a change in volume across the cell of approximately 1% where the photo conductor resistance changed over a range of 440 kiloms to 1 megohm.

For a rapid or short term transient change in the instantaneous value of the photo conductor 11 (such as would be caused by the formation of a cloud of water droplets in the expansion chamber 31 of the condensation nuclei meter during a sampling or measuring interval of the meter), the transient output signal pulse appearing across the load resistors 13 and 21 is completed before there is time for the feedback path comprised by 22 and 23 to take effect. The resultant instantaneous change (short term) in the voltage across the cell is some 85% of the percent change in its resistance value. This again is nearly twice the value that could be obtained with an equal arm measuring bridge and is due to the substantially flat slope of the $E/I$ curve of the FET 12. The provision of the second FET 33 improves the response of the circuit, and in addition, is in the form of a cathode follower so that it provides a low impedance output.

The short term transient signal pulse appearing across output load resistors 21 and 13 is supplied through coupling capacitor 25 which blocks the long term D.C. component of the signal to one input terminal of operational amplifier 17. Operational amplifier 17 also has a gain adjusting resistor network comprised by fixed resistors 34 and 35 and variable resistor 36 connected to the input terminal supplied through coupling capacitor 25, and has a feedback connection 37 between its output load resistor 38 and a second input terminal to the operational amplifier. The operational amplifier 17 may comprise a conventional, commercially available integrated circuit amplifier sold by a number of integrated circuit manufacturers, and is used to amplify the transient signal pulse voltage produced by the cloud of water droplets in the expansion chamber 31. The capacitor 25 blocks the D.C. componet of the signal so that operational amplifier 17 produces at its output a transient signal pulse whose magnitude is representative of the number of condensation nuclei contained in the sample gaseous atmosphere being monitored by the condensation nuclei meter.

In order to provide a continuous output indication or reading of the time average value of the transient output signal pulses appearing across the output load resistor 38 of operational amplifier 17, a holding circuit means is included in the output indicating arrangement of the detecting and amplifying circuit shown in FIG. 2. This holding circuit means is shown generally at 41 and includes a sampling capacitor 42 and a holding capacitor 43. The sampling capacitor 42 has one of its plates connected through the moveable contact of a sampling switch 44 to either of the fixed contacts 44a or 44b of the sampling switch. The fixed contact 44a is coupled through a coupling diode 45 to the output load resistor 38 of operational amplifier 17 and the fixed contact 44b is connected to one plate of the holding capacitor 43 and to an input terminal of a FET operational amplifier 46. The remaining plates of sampling capacitor 42 and holding capacitor 43 are connected to the grounded power supply terminal 15. The moveable contact of sampling switch 44 is connected through an interconnecting link shown at 47 which may comprise a mechanical interconnection, a pneumatic interconnection, or an electrical interconnection back to the expansion cycle apparatus 32 of the condensation nuclei meter. By this interconnection, the sampling switch 44 can be made to operate synchronously with the formation of the water cloud droplets in the expansion chamber 31 during operation of the condensation nuclei meter.

To complete the output indicating circuit, the FET operational amplifier 46 has its output load resistor 48 connected to drive a suitable indicating meter, cathode ray tube, recording chart, or other suitable recording instrument for providing an indication of the instantaneous value of the time average voltage appearing across the holding capacitor 43. Because the operational amplifier 46 employs a FET input stage having an extremely high input resistance, it does not load down the holding capacitor or substantially alter its charge value intermediate sampling intervals of the sampling capacitor 42 as will be described hereinafter.

The holding circuit means also further includes a resistor 49 and a second intermittently operated switch 51 connected to the juncture of the coupling diode 45 with the fixed contact 44a of the first sampling switch 44. With this arrangement, during operating intervals when the moveable contacts of switch 44 are closed on 44a and the switch 51 is closed, the charge on sampling capacitor 42 will be discharged through resistor 49 in order to condition it for the next successive transient output signal pulse supplied thereto from operational amplifier 17 through coupling diode 45. During these discharge intervals of operation, the blocking effect of diode 45 prevents the capacitor 42 and the discharge resistor 49 from loading down the output of operational amplifier 17.

During operation of the circuit shown in FIG. 2, the peak value of the transient output signal pulse appearing across the output resistor 38 of operational amplifier 17 is obtained by charging the sampling capacitor 42 to the peak value through coupling rectifier 45 and switch contacts 48. Switch 44 then sequentially is operated to close on contact 44b and transfer the charge built up on sampling capacitor 42 to the holding capacitor 43. If the capacitance value of holding capacitor 43 is equal to the capacitance value of the sampling capacitor 42, then one-half the change in peak vlaue output would appear on the holding capacitor 43 during each second assuming that the switching rate of switch 44 is 1 per second. If the capacitance C3 of capacitor 42 is substantially greater than the capacitance C4 of holding capacitor 43, there would be a complete response in one second, or if the C3 is smaller than C4, the time constant would be greater than two seconds. In this manner, the response of the instrument to changes in the physical phenomenon being observed can be tailored to the particular measuring application in mind. The output FET operational amplifier 46 can be designed to have in input resistance which is extremely high, for example $10^{11}$ ohms, so that the rate of decay on the holding capacitor 43 between changing or sampling intervals is negligible. The second switch S2 is designed to discharge the sampling capacitor 42 intermediate each sampling operation before it is recharged, so as to enable the holding circuit to follow immediately a decreasing level in the signal output from operational amplifier 17. The switching sequence is switch 44 closed on switch contact 44a from .6 second before the peak value to .1 second after the peak value. Switch 44 then closes on fixed contact 44b from .1 second after the peak value to .4 second after the peak value, and switch 51 is closed from about .4 second to .7 second after the peak value. This sequence of closure is cited as merely exemplary of one manner of operation of the holding circuit, and should not be considered as comprising the only or a preferred way of operating the circuit.

As a result of operation in the above-described manner, the sampling capacitor 42 will reach essentially the peak voltage value at the time of occurrence of the peak. At .1 of a second to .4 of a second after the peak value, it is in parallel with the holding capacitor 43 (and takes on the average voltage of $C_3+C_4$ just before they were put in parallel). At .6 of a second before the peak (.4 second after the peak) capacitor 42 is reconnected to 44a and from .6 second to .3 second before the peak (.4 second to .7 second after the peak) it is discharged partially to a lower voltage through switch 51 and resistor 49 prior to the commencement of a new sampling cycle in the above-described manner. The resistors 35 and 36 comprise a voltage divider for 0 (zero) adjustment to the input of operational amplifier 17.

Figure 3:
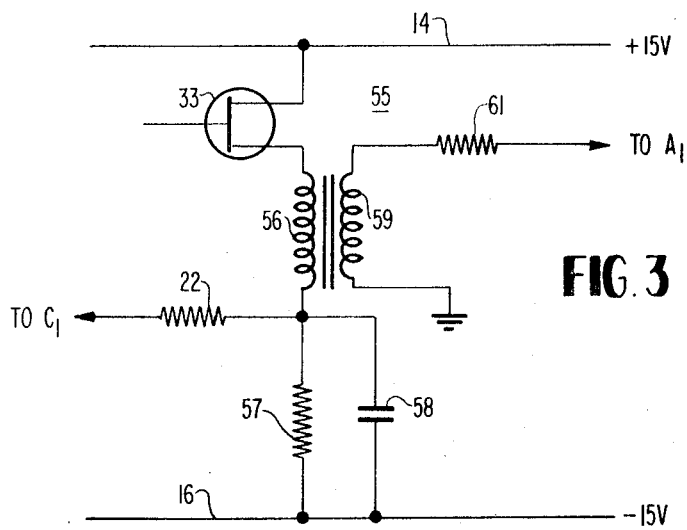
FIG. 3 is a partial schematic circuit diagram of an alternative form of output circuit for use in the detecting and amplifying circuit of FIG. 2.

FIG. 3 is a partial schematic circuit diagram of an alternative structure for providing direct current isolation between the output from the second FET 33 and the input to the operational amplifier 17. In the circuit arrangement of FIG. 3, a coupling transformer 55 is provided having its primary winding 56 connected in series circuit relationship between the source electrode of FET 33 and through a biasing network comprised by a parallel connected resistor 57 and capacitor 58 to the minus 15 volt power supply terminal 16. The secondary winding 59 of pulse transformer 55 can be connected through a limiting resistor 61 to the input of operational amplifier 17 shown in FIG. 2. In operation, the detecting and amplifying circuit if modified to include the pulse transformer 55 would function in substantially the same manner as was described in connection with the circuit of FIG. 2 with the exception that the coupling transformer 55 couples the transient signal pulses into the input of operational amplifier 17 while preventing any D.C. component of the signal from being supplied thereto. The coupling transformer arrangement of FIG. 3 may be preferred in those measuring applications where it is desired to provide greater isolation between the input stages of the circuit and the output indicating circuitry.

Figure 4:
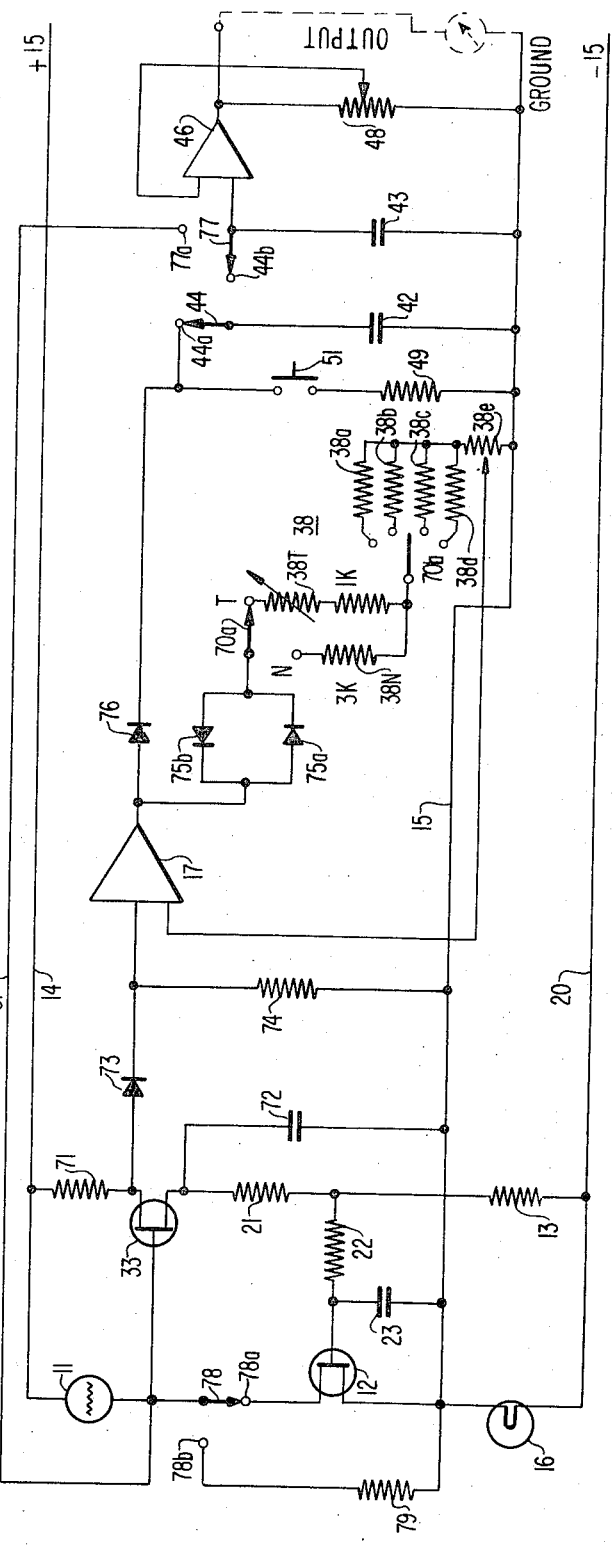
FIG. 4 is a partial schematic circuit diagram of still another alternative form of output circuit for use in the over-all detecting and amplifying circuit of FIG. 2.

FIG. 4 is a detailed schematic circuit diagram of a preferred form of construction of the detecting and amplifying circuit. While FIG. 4 is intended for use with a condensation nuclei meter in the same manner as shown in FIG. 2, the expansion cycle apparatus and expansion chamber have not been shown in FIG. 4 together with the interconnection to the sampling and holding switches for the purpose of simplifying the diagram. The appropriate interconnection of the circuit to provide for use with a condensation nuclei meter are believed to be obvious to one skilled in the art in the light of the teachings of FIG. 2. The circuit shown in FIG. 4 is intended for those measurement applications where it is desired to obtain positive going signal pulses in the output circuit for use with control equipment, data processing equipment, etc. which generally require a positive going input signal for compatibility.

Primarily for the above set forth reason, the second FET 33 has its drain electrode connected to the positive 15 volt power supply terminal 14 through a load resistor 71 has its source electrode connected through suitable biasing resistors 13 and 21 to minus 15 volt power supply terminal 20 and through a by-pass capacitor 72 to the ground supply terminal 15. The values of the resistors 13 and 21 are adjusted so as to provide the desired feedback effect for long term voltage changes in order to adjust the conductivity of the FET 12 to maintain constant voltage across the photo conductor 11. The transient output signal pulses do not appear across these resistors however because of by-pass capacitor 72. Instead, the transient output signal pulse appearing across resistor 71 will be positive going in nature and are coupled through coupling diode 73 and a fixed input resistor 74 to the input of operational amplifier 17.

In addition to the above changes, the circuit of FIG. 4 shows a different range or scale changing network for use in changing the range of operation of the measuring circuit. This range or scale changing network 38 is comprised by two parallel connected resistors 38n and 38t, a pair of scale changing switches 70a and 70b and a plurality of scale changing fixed resistors 38a–38b. The output from operational amplifier 17 is connected to the scale changing resistive network 38 through a pair of reverse polarity, parallel connected diodes 75a and 75b to the first scale changing selector switch 70a. Switch 70a is designed to be selectively closed on either fixed switch contact N or T. With 70a closed on N, fixed resistor 38n is connected in the output of operational amplifier 17 for normal operation. When thus connected, 70b may be connected to any one of the plurality of scale changing resistors 38a–38b depending upon the measurement scale desired. The reverse polarity, parallel connected diodes 75b and 75a are added into the circuit in order to compensate for the voltage drop across the output coupling diodes 76 for improved measurement accuracy. Feedback to the input of operation amplifier 17 is obtained across commonly connected resistor 38e.

For some types of tests employing condensation nuclei detectors, it is desirable to obtain a percent change in measurement of the nuclei particles being detected. For this purpose, the additional contact T and variable resistor 38t are provided along with the scale changing resistors 38a–38b. This additional contact is used, for example, when one wishes to employ the condensation nuclei meter for particle size measuring purposes. For such purposes, a diffusion box would be inserted in the measuring system in advance of the condensation nuclei meter following a first reading of the meter without the diffusion box. Because a diffusion box can be designed to discern or discriminate against only a given size particle, the loss of such particles through the diffusion box will be known. Accordingly, while making particle size measurements, with switch 70a closed on T, variable resistor 38t is adjusted to provide a full scale reading of the meter connected to the output of FET operational amplifier 46. Thereafter, the diffusion box is inserted in the measuring system, and a second measurement is taken. This second measurement will provide a direct reading of the percent transmission of particles through the diffusion box of all save the known particle size to which the diffusion box responds. In this manner, the instrument can be adjusted readily to facilitate particle size measurement.

In addition to the above features of positive signal output and facilitating particle size measurements, the circuit of FIG. 4 includes an additional circuit feature which allows an operator of the equipment to check the condition of the photo conductor 11 and/or the optics of the instrument. This additional circuit feature is comprised by a selector switch 77 which normally is closed on the fixed contact 44b of sampling switch 44 but selectively may be closed on a fixed contact 77a that is coupled back through a conductor 81 to the juncture of the photo conductor 11 with the FET 12. This juncture is also connected through a selector switch 78 which normally is closed on its fixed contact 78a that is connected to the drain electrode of FET 12. Selector switch 78 may also be closed on a fixed contact 78b that is connected through a calibrating resistor 79 to the grounded power supply terminal 15. With this arrangement, an operator of the equipment selectively may close the switches 77 and 78 so as to connect in the calibrating resistor 79 to the output of the measuring circuit. When thus connected, the output will provide a direct indication of the level of adjustment required of FET 12 to maintain the voltage across photo conductor 11 at its constant design value. This in turn will be indicative of the condition of the optics, etc. thereby indicating that the optics should be cleaned, the photo conductor replaced because of aging, etc. In all other respects, the circuit of FIG. 4 functions in precisely the same manner as the circuit arrangement described with relation to FIG. 2.

From the foregoing description, it will be appreciated that the present invention provides a new and improved self-adjusting, short pulse detecting and amplifying circuit for use with a wide variety of measuring or detecting elements, and which automatically maintains its sensitivity over wide periods of usage despite the effects of aging, dust and dirt collection, temperature and the like. The detecting and amplifying circuit is relatively simple in construction and low in cost while maintaining high accuracy and is particularly suited for use with low cost, electro-optical detectors such as cadmium sulphide photo conductors while maintaining high accuracy.

Having described several embodiments of a preferred manner of constructing a new and improved self-adjusting detecting and amplifying circuit in accordance with the invention, it is believed obvious that other modifications and variations of the invention are possible in the light of the above teachings. It is, therefore, to be understood that the particular embodiments of the invention described are by way of example only and that the scope of the invention is to be determined as set forth in the attached claims.

I claim:

1. In a device for detecting changes in a physical phenomenon being sensed such as the presence of particles in a light beam, the improvement comprising a self-adjusting detecting and amplifying circuit including an electrically operable detecting element for sensing short term changes in a physical phenomenon from a first condition to a second different condition as distinguished from longer term changes in operating condition of the detecting element due to temperature effects, aging and the like, terminal means for connection to a source of electric energy, conductivity controlled means connected in circuit relationship with said detecting element and with said terminal means for maintaining substantially constant long term electric energization conditions across said detecting element, output circuit means coupled to said detecting element and responsive to both long and short term changes in operating condition of said detecting element, feedback circuit means coupling said output circuit means to said conductivity controlled means and responsive substantially only to the longer term changes in operating condition of said detecting element for continuously and automatically adjusting the conductivity controlled means to compensate for the longer term changes in operating condition whereby substantially constant long term electric energization is maintained across said detecting element, and output indicating means responsive substantially only to the short term changes in operating condition of the detecting element connected across said output circuit means for deriving an output indication of the short term changes in the physical phenomenon being sensed by said detecting element.

2. A self-adjusting detecting and amplifying circuit according to claim 1 further including signal holding means comprising a part of said output indicating means for holding and providing a substantially continuous output indication of the transient changes in the physical phenomenon being sensed by the detecting element.

3. A self-adjusting detecting and amplifying circuit according to claim 1 wherein said detecting element comprises a light sensitive electro-optical device responsive to changes in intensity of light falling thereon for deriving an output electrical signal representative of such changes in light intensity.

4. A self-adjusting detecting and amplifying circuit according to claim 3 wherein the light sensitive electro-optical device comprises a low cost photo conductor of the cadmium sulphide type.

5. A self-adjusting detecting and amplifying circuit according to claim 1 wherein said conductivity controlled means comprises a gate controlled transistor device connected in series circuit relationship with the detecting element and said feedback circuit means is connected to the control gate of the transistor device to control its conductivity and thereby maintain substantially constant voltage across said detecting element.

6. A self-adjusting detecting and amplifying circuit according to claim 5 wherein said feedback circuit means comprises a resistor-capacitor coupling network having a long RC constant.

7. A self-adjusting detecting and amplifying circuit according to claim 6 wherein the gate controlled transistor comprises a field effect transistor having its gate electrode connected to the output from the feedback resistor-capacitor network, and having its source and drain electrodes connected in series circuit relationship with the detecting element for maintaining substantially constant voltage across the detecting element.

8. A self-adjusting detecting and amplifying circuit according to claim 7 wherein said output indicating means includes signal holding means for holding and providing a continuous output indication of the transient changes in the physical phenomenon being sensed by the detecting element.

9. A self-adjusting detecting and amplifying circuit according to claim 7 wherein the electrically operable detecting element comprises a light sensitive electro-optical device formed by a low cost photo conductor of the cadmium sulphide type.

10. A self-adjusting detecting and amplifying circuit according to claim 7 further including a second field effect transistor having its gate electrode connected to the juncture of the detecting element and the first field effect transistor and having a load resistor connected to the source electrode thereof in a cathode follower configuration and forming said output circuit means, and wherein said output indicating means includes a coupling capacitor connected to said load resistor that serves to block any long term direct current component of an electric output signal developed across said load resistor from the output indication derived.

11. A self-adjusting detecting and amplifying circuit according to claim 10 wherein the electrically operable detecting element comprises a light sensitive electro-optical device formed by a low cost photo conductor of the cadmium sulphide type.

12. A self-adjusting detecting and amplifying circuit according to claim 11 wherein said output indicating circuit further includes a first operational amplifier having its input coupled through said coupling capacitor across said load resistor, and having scale changing network means coupled to the operational amplifier for changing the sensitivity of the instrument to accommodate a wide range of signal input levels to the detecting element which are representative of widely different values of conditions of the physical phenomenon being measured.

13. A self-adjusting detecting and amplifying circuit according to claim 12 further including holding circuit means coupled to the output of the operational amplifier and wherein said holding circuit means comprises a sampling capacitor and a holding capacitor, first switch means for intermittently coupling said sampling capacitor to the output of said first operational amplifier and thereafter sequentially coupling said sampling capacitor across said holding capacitor, a second field effect transistor operational amplifier having its input connected across said holding capacitor and having its output supplying a suitable indicating meter capable of providing a continuous visual indication of the physical phenomenon being measured by the photo conductor detecting element.

14. A self-adjusting detecting and amplifying circuit according to claim 13 wherein the holding circuit means further includes a second switching device and a discharge resistor intermittently connected in series circuit relationship through said second switching device across said sampling capacitor sequentially intermediate each operation of said first switching device, and a properly poled coupling diode connected intermediate the output from the first operational amplifier and the first switching device whereby the coupling diode blocks any discharge current from the sampling capacitor back into the output of the first operational amplifier and causes it to discharge only through said discharge resistor intermediate each sampling interval.

15. A self-adjusting detecting and amplifying circuit according to claim 14 further including means interconnecting the first and second switching devices in the holding circuit means with an expansion cycle apparatus of a condensation nuclei meter whereby sequential operation of the first and second switching devices is co-ordinated with the expansion of cycle of the condensation nuclei meter and the output indication obtained from the meter connected to the output of the second field effect transistor operational amplifier is representative of the particle count in sample gaseous atmospheres being monitored by the condensation nuclei meter.

16. A self-adjusting detecting and amplifying circuit according to claim 15 wherein the scale changing network means comprises a plurality of scale changing resistors and first selector switch means for selectively connecting a desired one of the plurality of scale changing resistors in circuit relationship with the first operational amplifier, a fixed value scaling resistor and a variable scaling resistor, and second selector switch means for selectively connecting either said fixed or said variable scaling resistor in circuit relationship with said plurality of scale changing resistors whereby the circuit may be operated selectively in a normal absolute reading mode with the fixed value scaling resistor connected in circuit relationship or may be operated in a comparative percent of previously measured signal mode with the variable value scaling resistor connector in circuit relationship.

17. A self-adjusting detecting and amplifying circuit according to claim 16 wherein the scale changing network means is connected in the output of the first operational amplifier and further includes a pair of reverse polarity parallel connected diodes connected in series therewith in the feedback path to the first operational amplifier for compensating for the diode drop of the properly poled coupling diode.

18. A self-adjusting detecting and amplifying circuit according to claim 17 further including detecting element condition calibrating circuit means comprising a calibrating resistor and first calibrating selector switch means for connecting said calibrating resistor in series circuit relationship with the detecting element in place of the conductively controlled first field effect transistor, and second calibrating selector switch means for connecting the juncture of the detecting element with the calibrating resistor or selectively the conductivity controlled first field effect transistor directly to the input of the output indicating means for obtaining a comparison calibration check of the condition of the detecting element.

19. A self-adjusting detecting and amplifying circuit according to claim 12 wherein the scale changing network means comprises a plurality of scale changing resistors and first selector switch means for selectively connecting a desired one of the plurality of scale changing resistors in circuit relationship with the first operational amplifier, a fixed value scaling resistor and a variable scaling resistor, and second selector switch means for selectively connecting either said fixed or said variable scaling resistor in circuit relationship with said plurality of scale changing resistors whereby the circuit may be operated selectively in a normal absolute reading mode with the fixed value scaling resistor connected in circuit relationship or may be operated in a comparative percent of previously measured signal mode with the variable value scaling resistor connected in circuit relationship.

20. A self-adjusting detecting and amplifying circuit according to claim 19 wherein the scale changing network means is connected in the output of the first operational amplifier and further includes a pair of reverse polarity parallel connected diodes connected in series therewith in the feedback path to the first operational amplifier for compensating for the diode drop of the properly poled coupling diode.

21. A self-adjusting detecting and amplifying circuit according to claim 7 further including element condition calibrating circuit means comprising a calibrating resistor and first calibrating selector switch means for connecting said calibrating resistor in series circuit relationship with the detecting element in place of the conductively controlled first field effect transistor, and second calibrating selector switch means for connecting the juncture of the detecting element with the calibrating resistor or selectively the conductivity controlled first field effect transistor directly to the input of the output indicating means for obtaining a comparison calibration check of the condition of the detecting element.

22. A self-adjusting detecting and amplifying circuit according to claim 7 further including a second field effect transistor having its gate electrode connected to the juncture of the detecting element and the first field effect transistor having the primary winding of a coupling transformer connected to the source electrode thereof with the secondary winding of said coupling transformer serving to provide pulsed output signals to the output indicating means while blocking any long term D.C. component from the output.

23. In a device for detecting changes in a physical phenomenon being sensed such as the presence of particles in the light beam of a condensation nuclei monitor, the improvement comprising an amplifying circuit including signal holding circuit means coupled to the output of a signal amplifier for a signal desired to be measured, said signal holding circuit means comprising a sampling capacitor and a holding capacitor, a first switching device for intermittently coupling said sampling capacitor to the output of the signal amplifier and thereafter sequentially coupling said sampling capacitor across said holding capacitor, a field effect transistor operational amplifier having its input connected across said holding capacitor and having its output supplying a suitable indicating meter capable of providing a continuous visual indication of the value of a signal being measured, a second switching device, a discharge resistor intermittently connected in series circuit relationship through said second switching device across said sampling capacitor sequentially intermediate each operation of said first switching device, a properly poled coupling diode connected intermediate the output from the first amplifier and the first switching device whereby the coupling diode blocks any discharge current from the sampling capacitor back into the output of the first amplifier and causes it to discharge only through said discharge resistor intermediate each sampling interval and means interconnecting the first and second switching devices in the holding circuit means with an expansion cycle apparatus of a condensation nuclei meter whereby sequential operation of the first and second switching devices is coordinated with the expansion cycle of the condensation nuclei meter and the output indication obtained from the meter connected to the ouput of the second field effect transistor operational amplifier is representative of the particle count in sample gaseous atmospheres being monitored by the condensation nuclei meter.

24. In a device for detecting changes in a physical phenomenon being sensed such as the presence of particles in a light beam, the improvement comprising a self adjusting detecting and amplifying circuit including an electrically operable detecting element for sensing short term changes in a physical phenomenon from an ambient condition to a different condition as distinguished from longer term changes in operating characteristics due to temperature effects, aging and the like, terminal means for connection to a source of electric energy, means connected in circuit relationship with said detecting element and said terminal means for maintaining substantially constant long term electric energization conditions across said detecting element, a feedback amplifier having said detecting element connected to the input thereof and responsive to both long and short term changes in operating conditions of said detecting element, long time constant feedback circuit means coupling the output of said feedback amplifier back to control the operation of the means for maintaining long term electric energization conditions across said detecting element, and output indicating means responsive substantially only to the short term changes in operating condition of the detecting element coupled to the output from the feedback amplifier for deriving an output indication of the short term changes in the physical phenomenon being sensed by the detecting element.

25. A self adjusting detecting and amplifying circuit according to claim 24 wherein the detecting element comprises an electro-optical detecting element for sensing transient changes in light level of a light beam directed to impinge upon the electro-optical detecting element as opposed to long term changes in light response characteristics due to aging, temperature effects, dust or other impairment of the light optic path and the like.

References Cited
UNITED STATES PATENTS
2,808,755  10/1957  Miller _____ 356—173

RONALD L. WILBERT, Primary Examiner

W. A. SKLAR, Assistant Examiner

U.S. Cl. X.R.

324—111, 115; 250—218; 356—102, 104, 208, 215